(12) United States Patent
Xu et al.

(10) Patent No.: US 11,770,250 B2
(45) Date of Patent: Sep. 26, 2023

(54) METHOD AND SYSTEM FOR ENSURING SEARCH COMPLETENESS OF SEARCHABLE PUBLIC KEY ENCRYPTION

(71) Applicant: Huazhong University of Science and Technology, Wuhan (CN)

(72) Inventors: Peng Xu, Wuhan (CN); Tianyang Chen, Wuhan (CN); Yubo Zheng, Wuhan (CN); Hai Jin, Wuhan (CN); Wei Wang, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 257 days.

(21) Appl. No.: 17/444,224

(22) Filed: Aug. 2, 2021

(65) Prior Publication Data
US 2022/0255739 A1 Aug. 11, 2022

(30) Foreign Application Priority Data
Feb. 10, 2021 (CN) .......................... 202110188205.7

(51) Int. Cl.
*H04L 9/06* (2006.01)
*H04L 9/40* (2022.01)
(Continued)

(52) U.S. Cl.
CPC .............. *H04L 9/30* (2013.01); *H04L 9/0618* (2013.01); *H04L 9/50* (2022.05)

(58) Field of Classification Search
CPC . H04L 9/30; H04L 9/0618; H04L 9/50; H04L 9/0861; H04L 63/0428; H04L 67/10; H04L 67/1097
See application file for complete search history.

(56) References Cited

U.S. PATENT DOCUMENTS

2014/0298009 A1\* 10/2014 Hattori ................. H04L 63/065
713/155
2019/0260715 A1\* 8/2019 Suzuki .................. H04L 9/0618
(Continued)

FOREIGN PATENT DOCUMENTS

CN 104394155 B 12/2017

OTHER PUBLICATIONS

Multi-Keyword Certificateless Searchable Public Key Authenticated Encryption Scheme Based on Blockchain, by Yang et al.; published Sep. 2020. (Year: 2020).\*
(Continued)

*Primary Examiner* — Vu V Tran
(74) *Attorney, Agent, or Firm* — Michael Ye; Rimon Law

(57) ABSTRACT

The present invention relates a method for ensuring search completeness of searchable public key encryption, applicable to a blockchain network formed by a plurality of computer nodes. The method at least comprises: the blockchain network receiving a keyword ciphertext and a corresponding file-identifier ciphertext generated by a transmitting end based on the public key encryption, and at least one miner storing the ciphertexts in a ciphertext table; the blockchain network receiving a search trapdoor $T_w$ transmitted by a receiving end, generated according to a private key and a keyword w to be searched; the at least one miner in the blockchain network performing a secure search based on information of a state table and the search trapdoor $T_w$, and outputting a search result to the blockchain network; and the blockchain network feeding the search result back to the receiving end. The invention uses the blockchain technology to solve the long-standing search completeness problem in searchable public key encryption, and the proposed method has universality.

8 Claims, 2 Drawing Sheets

(51) Int. Cl.
*H04L 9/08* (2006.01)
*H04L 67/10* (2022.01)
*H04L 67/1097* (2022.01)
*H04L 9/00* (2022.01)
*H04L 9/30* (2006.01)

(56) References Cited

U.S. PATENT DOCUMENTS

2021/0081562 A1* 3/2021 Hirano ............... H04L 9/06
2021/0194670 A1* 6/2021 Tahir ................ H04L 9/0825
2021/0232568 A1* 7/2021 Yoon ................ G06F 16/27

OTHER PUBLICATIONS

Deniably authenticated searchable encryption scheme based on Blockchain for medical image data sharing, by Wang et al.; published Jun. 2020. (Year: 2020).*

* cited by examiner

METHOD AND SYSTEM FOR ENSURING SEARCH COMPLETENESS OF SEARCHABLE PUBLIC KEY ENCRYPTION

This application claims the benefit of the Chinese Patent Application No. CN 202110188205.7 filed on Feb. 10, 2021, which is hereby incorporated by reference as if fully set forth herein.

BACKGROUND OF THE INVENTION

1. Technical Field

The present invention relates to encryption, and more particularly to a method and a system for ensuring search completeness of searchable public key encryption (SPE).

2. Description of Related Art

With the development of the cloud computing industry, technologies of data outsourcing and sharing have progressed at an increasing pace. Cloud-assisted data outsourcing and sharing are nowadays popular for the convenience and efficiency they provide. For users needing these services for their crucial and confidential data, such as business users of cloud mail platform, it is a common practice that data are encrypted before being uploaded to cloud platforms. However, since servers are unable to do computation with encrypted data, in the occasions of data sharing, search among shared, encrypted data is impossible to a receiving party, making it time-consuming to use these shared data.

For solving this problem, searchable public key encryption (SPE), also known as public key encryption with keyword-search (PEKS), was introduced. This technology allows a transmitting party to encrypt keywords using a public key of a receiving party, so as to generate a searchable ciphertext. Then the receiving party uses its own private key to generate a search trapdoor, and submits the search trapdoor to the server. The server uses the search trapdoor to perform secure search over the data shared by the transmitting party. This process is secure because the information of the underlying keywords of both the search trapdoor and searchable ciphertext remains in secrecy. Due to its convenience, SPE has received extensive attention and many researches have been made for it. After years of development, a hidden structure of SPE ciphertexts was introduced, leading to a huge leap of SPE search efficiency. However, none of the existing SPE approaches can ensure completeness of search results. In SPE, servers are likely to return users with incomplete search results for reasons such as internal errors or an attempt to save computational overheads. Such incompletion is because there is no secret information shared between the transmitting end and the receiving end in a SPE application model, and thus the receiving end does not know how many searchable ciphertexts it receives.

For example, China Patent No. CN104394155B discloses a multi-user cloud encryption keyword searching method that can verify integrality and completeness. This method can verify completeness of query results and integrity of outsourced data in a cloud environment, and grant authorization to multiple users. The method encrypts a file by binding keyword index and associated encrypted files using signatures, thereby verifying search results in terms of completeness and integrality. The method realizes multi-user hidden inquiries by means of re-encryption and allows dynamic update of inquiry access of users. However, the prior disclosure fails to combine encryption with the blockchain technology, and is less general.

Blockchains represent an emerging distributed ledger technology, featuring decentralized consensus and immutability. Also, the blockchain technology allows users to define functions to be executed on blockchains through the use of smart contracts. Hence, the present invention leverages the blockchain technology to ensure SPE-based search completeness.

Further, since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with technical features known in the art as support.

SUMMARY OF THE INVENTION

In order to solve the problems of existing knowledge, the present invention provides a method for ensuring search completeness of searchable public key encryption, applicable to a blockchain network formed by a plurality of computer nodes, the method at least comprising: the blockchain network receiving a keyword ciphertext and a corresponding file-identifier ciphertext generated by a transmitting end based on the public key encryption and at least one miner storing the ciphertexts in a ciphertext table; the blockchain network receiving a search trapdoor $T_w$ transmitted by a receiving end, generated according to a private key and a keyword w to be searched; the at least one miner in the blockchain network performing a secure search based on information of a state table and the search trapdoor $T_w$, and outputting a search result to the blockchain network; and the blockchain network feeding the search result back to the receiving end.

The present invention provides a method for ensuring completeness. Particularly, the method is for ensuring completeness of secure search using a SPE scheme. The present invention ensures: in all ciphertexts a transmitting end sends to a receiving end, the blockchain network returns the receiving end with search results that are the ciphertexts perfectly matching the keywords contained in the search trapdoor. This means that the search results obtained from the blockchain network do not include any redundant search results while missing no search results. the present invention makes full use of decentralized consensus and data immutability of the blockchain technology to distribute operations of storing ciphertexts and performing encrypted search across the blockchain network, so that the search result from the blockchain network for a search request submitted by a receiving end is always complete without any missed or redundant search results. In other words, the present invention ensures completeness of SPE search. Any SPE instance that satisfies the algorithm definition provided by the present invention can use the present invention to ensure completeness of the search results.

Preferably, the public key and the private key are generated through initialization of the blockchain network and the receiving end, in which the blockchain network shares the public key to the transmitting end.

Preferably, the method further comprising: the miner in the blockchain network, for the receiving end, initializing a ciphertext table cipherTable$_{PK}$ and a state table stateTable$_{PK}$ on a distributed ledger of the blockchain network.

Preferably, the transmitting end generating the keyword ciphertext and the corresponding file-identifier ciphertext based on the public key encryption comprises: entering the keyword w, a file identifier id and the public key PK=(PK$_{PEKS}$,PK$_{PKE}$) to be encrypted, computing the keyword ciphertext C$_{PEKS}$←PEKS.Enc(PK$_{PEKS}$,w) based on a keyword encryption algorithm, and computing the file-identifier ciphertext C$_{PKE}$ PKE.Enc(PK$_{PKE}$,id) based on a public key encryption algorithm, so as to generate the ciphertext C←(C$_{PEKS}$,C$_{PKE}$); and encoding the ciphertext C and the public key PK so as to generate at least one first blockchain transaction, and publishing the first blockchain transaction to the blockchain network.

Preferably, the at least one miner storing the ciphertext in the ciphertext table comprises: the at least one miner in the blockchain network analyzing the ciphertext C and the public key PK in the first blockchain transaction, and based on a length len of the ciphertext table cipherTable$_{PK}$, storing the ciphertext C at the len+1 position in the ciphertext table cipherTable$_{PK}$; the miner, after at least one mining success, generating a new block including the first blockchain transaction block and publishing the new block in the blockchain network, and when the new block including the first blockchain transaction is validated and accepted by more than two thirds of the total nodes in the blockchain network, the ciphertext C being acknowledged by the blockchain network and stored in the blockchain network.

Preferably, the receiving end generating the search trapdoor T$_w$ based on the private key and the keyword w to be searched comprises: entering the keyword w to be searched and the private key SK=(SK$_{PEKS}$,SK$_{PKE}$), executing a search trapdoor-generating algorithm T$_w$ PEKS. Trap door (SK$_{PEKS}$,w); encoding the search trapdoor T$_w$ and the public key PK=(PK$_{PEKS}$,PK$_{PKE}$) to generate at least one second blockchain transaction, and publishing the second blockchain transaction to the blockchain network.

Preferably, at least one miner performing secure search based on information of the state table and the search trapdoor T$_w$ comprises: the miner, based on the second blockchain transaction, analyzing the search trapdoor T$_w$ and the public key PK, so as to extract ind←stateTable$_{PK}$[T$_w$] from the state table stateTable$_{PK}$, and acquiring the length len of the ciphertext table cipherTable$_{PK}$; ind being null indicating that there is not an entry corresponding to the search trapdoor T$_w$ in the state table stateTable$_{PK}$, and initializing ind to 0; for an integer i that satisfies ind+1≤i≤len, taking the i$^{th}$ ciphertext C$_i$←cipherTable$_{PK}$[i] from the ciphertext table cipherTable$_{PK}$, in which the ciphertext C$_i$ is denoted by (C$_{PKES}^i$,C$_{PKE}^i$), and executing the following operation: based on the PEKS public key PK$_{PEKS}$, the search trapdoor T$_w$ and the keyword ciphertext C$_{PEKS}^i$, executing a keyword ciphertext testing algorithm b←PEKS. Test(PK$_{PEKS}$,T$_w$,C$_{PEKS}^i$), so as to obtain a bit value b, and if b=1, indicating that the keyword ciphertext C$_{PEKS}^i$ includes the keyword w to be searched, and outputting a tuple (T$_w$,C$_{PKE}^i$) composed of the search trapdoor and the file-identifier ciphertext as a search result to the blockchain network.

Then the record stateTable$_{PK}$[T$_w$]←len in the state table stateTable$_{PK}$ is updated.

Preferably, at least one miner, based on the information of the state table and the search trapdoor T$_w$, executing the secure search further comprises: the miner, after at least one mining success, generating a new block including the second blockchain transaction block and publishing the new block into the blockchain network, and when the new block including the second blockchain transaction is validated and accepted by more than two thirds of the total nodes in the blockchain network, the search trapdoor T$_w$ and the public key PK as well as the corresponding search result being acknowledged by the blockchain network and stored in the blockchain network.

Preferably, the method further comprises: the receiving end, based on search trapdoor T$_w$, fetching at least one search result from the blockchain network, and executing a decryption algorithm id←PKE.Dec(SK$_{PKE}$,C$_{PKE}$) over the file-identifier ciphertext C$_{PKE}$, so as to obtain the desired file identifier id.

In the present invention, storage and search of searchable ciphertexts are performed directly by a blockchain miner. Due to distributed consensus and data immutability of blockchains, all operations and computations conducted by miners, such as storing and searching ciphertexts, are validated by other nodes in the same network, and all the operational and computational results are stored in the blockchain forever for future audit uses. Therefore, with the disclosed method, the results of search received by the receiving end from the miner are all complete and correct, meaning that the disclosed method is effective in ensuring SPE search completeness. Meanwhile, in the present invention, a blockchain acts as a search server that serves the transmitting end and the receiving end, so the existing SPE application models remain unchanged.

The present invention further provides a system for ensuring search completeness of searchable public key encryption, the system at least comprises a processor and a computer-readable storage medium, the processor forms a blockchain network with a plurality of computers, and the processor reads an executable program from the computer-readable storage medium, and the executable program executes the method for ensuring search completeness of searchable public key encryption of the present invention.

DETAILED DESCRIPTION OF THE INVENTION

The following description details the present invention with reference to the accompanying drawings.

The present invention provides a method and a system for ensuring search completeness of searchable public key encryption. The present invention may be further referred to as a security assurance system and a security assurance method based on search completeness of searchable public key encryption.

As used herein, the term "completeness" refers to a case where a search result that a server returns to a user from all ciphertexts that a transmitting end send to a receiving end are the ciphertexts perfectly matching the keywords contained in the search trapdoor, without any redundant or missed part. Such completeness is search completeness of the present invention.

Figure 1:
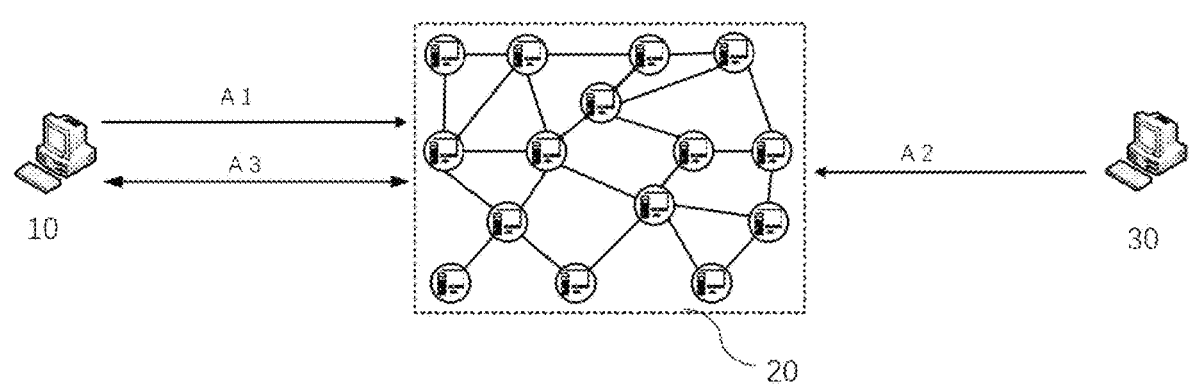
FIG. 1 is a schematic drawing showing a system for ensuring search completeness of searchable public key encryption according to the present invention.
Figure 2:
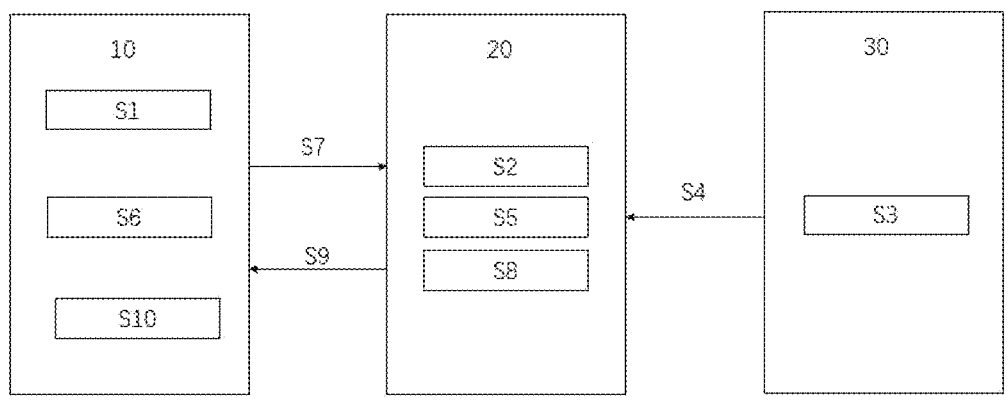
FIG. 2 is a block flow diagram of a method for ensuring search completeness of searchable public key encryption according to the present invention.

The disclosed system is shown in FIG. 1 and at least comprises a processor and a computer-readable medium. The computer-readable storage medium is used to store executable programs.

The processor is used to read executable programs from the computer-readable storage medium and execute the blockchain-based method for ensuring search completeness of searchable public key encryption according to the present invention.

The processor may be any one or a combination of one or more of servers, a cloud server, and an application specific integrated circuit.

In the present invention, plural processors are connected together to form a blockchain network 20. The blockchain network 20 is a network composed of plural computer nodes belonging to different owners. It stores the ciphertexts that transmitting end 30 shares to the receiving end 10, and executes search requests made by the receiving end 10.

The receiving end and the transmitting end may each be a device that can transmit information to and from the processors, such as a mobile device or a fixed device. For example, the receiving end and the transmitting end may each be a desktop computer, a portable computer, a tablet computer or a wearable device.

The receiving end 10 and the transmitting end 30 transmits/receives and share data through the blockchain network 20. The transmitting end 30 is the sharing end of data, which shares encrypted data with the receiving end. The receiving end 10 receives the data shared by the transmitting end.

As shown in FIG. 1, the disclosed system is formed by three two-party protocols, comprising: the initialization protocol A1 acting between the receiving end and the blockchain network; the ciphertext-generating and uploading protocol A2 acting between the transmitting end and the blockchain network; and search and decryption protocol A3 acting between the receiving end and the blockchain network.

As used herein, the term "miner" refers to a computer node that conducts mining.

In the present invention, during the process where the receiving end is combined with the blockchain network for initialization, security parameter $\lambda$ have to be defined in advance according to application needs, and a public-private key pair for the receiving end has to be generated according to the security parameters. Therein, $\lambda$ is a non-zero natural number. The greater value of this non-zero natural number means that the resulting searchable public key encryption method provides higher security, making the corresponding computation more complicated.

In the present invention, a SPE system PEKS and a public key encryption system PEK are defined as below.

A SPE system PEKS comprises four algorithms: a key-generating algorithm PEKS. Setup, a keyword-encrypting algorithm PEKS.Enc, a search trapdoor-generating algorithm PEKS.Trapdoor and a ciphertext-testing algorithm PEKS.Test. These algorithms are defined as below.

B1: Key-generating algorithm ($PK_{PEKS}$, $SK_{PEKS}$)←PEKS. Setup($\lambda$)

The input is the security parameter $\lambda$, and the outputs are the public key $PK_{PEKS}$ and the private key $SK_{PEKS}$ for PEKS. Therein, ($PK_{PKES}$, $SK_{PEKS}$) refers to a public-private key pair. The security parameter $\lambda$ determines the bit lengths of the public key $PK_{PEKS}$ and the private key $SK_{PEKS}$ The greater $\lambda$ is, the securer the public key $PK_{PEKS}$ and the private key $SK_{PEKS}$ are.

The public key $PK_{PEKS}$ and the private key $SK_{PEKS}$ are generated through the process below.

In a step B11, two multiplicative cyclic groups $G_1$ and $G_2$ or prime order p are selected, wherein the scale of p is equivalent to $\lambda$ in terms of scale.

B12 involves initializing at least one bilinear map ê: $G_1 \times G_1 \rightarrow G_2$, whose main natures are:

i. for an arbitrary element, a, $b \in \mathbb{G}_1$, $\hat{e}(a,b) \in \mathbb{G}_2$;

ii. for an arbitrary non-zero integer, x, $y \in Z_p^*$, a, $b \in \mathbb{G}_1$, both having $\hat{e}(a^x, b^y) = \hat{e}(a,b)^{xy}$, where $Z_p^*$ denotes a set of integers modulo p excluding 0;

iii. for an arbitrary group $\mathbb{G}_1$ generator g, $\hat{e}(g,g)$ is also the generator of the group $G_2$.

The step B13 involves selecting two cryptographic hash functions $H_1: \{0,1\}^* \rightarrow \mathbb{G}_1$ and $H_2: \mathbb{G}_2 \rightarrow \{0, 1\}^{\log p}$. Therein, $\{0,1\}^*$ denotes a bit string of an arbitrary length. $\{0,1\}^{\log p}$ denotes a bit string of a length of log p.

The B14 includes selecting a generator g for the group $G_1$, randomly select an integer $s \in Z_p^*$; making $PK_{PEKS} = (\mathbb{G}_1, \mathbb{G}_2, \hat{e}, H_1, H_2, g, h=g^s)$, $SK_{PEKS}=s$, and returning ($PK_{PEKS}, SK_{PEKS}$)

The step B2 is about executing the keyword encryption algorithm $C_{PEKS} \leftarrow PEKS.Enc(PK_{PEKS}, w)$.

After $PK_{PEKS} = (\mathbb{G}_1, \mathbb{G}_2, \hat{e}, H_1, H_2, g, h=g^s)$ and the keyword w to be encrypted are input, keyword ciphertext $C_{PEKS}$ is probabilistically output. The term "probabilistically" refers to the fact that for several times of calling PEKS.Enc, even if the input $PK_{PEKS}$ and the keyword w remain unchanged every time, the generated keyword ciphertexts $C_{PEKS}$ for different times are different.

Specifically, this step includes selecting a random number $r \in Z_p^*$ first, calculating the discriminative part $t=\hat{e}(H_1(w), h^r)$ of the keyword ciphertext, and returning the searchable ciphertext $(g^r, H_2(t))$.

B3 is about executing the search trapdoor-generating algorithm $T_w \leftarrow PEKS.Trapdoor(SK_{PEKS}, w)$.

This step includes the PEKS private key $SK_{PEKS}=s$ and the keyword to be searched, and outputting the search trapdoor $T_w = H_1(w)^s$.

B4 is about executing the ciphertext testing algorithm $b \leftarrow PEKS.Test(PK_{PEKS}, T_w, C_{PEKS})$.

This step includes entering the PEKS public key $PK_{PEKS} = (\mathbb{G}_1, \mathbb{G}_2, \hat{e}, H_1, H_2, g, h=g^s)$, the search trapdoor $T_w = H_1(w)^s$ and the keyword ciphertext $C_{PEKS}$, and outputting a bit b. If the keyword ciphertext $C_{PEKS}$ is generated by using the PEKS public key $PK_{PEKS}$ to encrypt the keyword w contained in the search trapdoor $T_w$, and the PEKS public key $PK_{PEKS}$ and the PEKS private key $SK_{PEKS}$ used to generate the search trapdoor $T_w$ form a public-private key pair, b=1; otherwise b=0.

It is determined that keyword ciphertext $C_{PEKS}=(g^r, H_2(t))$. Then it is to be verified whether $H_2(\hat{e}(T_w, g^r))$ is equal to $H_2(t)$. If yes, 1 is output; otherwise, 0 is output.

In the public key encryption system PKE, there are three algorithms: the key-generating algorithm PKE. Setup, the encryption algorithm PKE.Enc and the decryption algorithm PKE.Dec. These algorithms are defined as described below.

C1 is about executing the key-generating algorithm ($PK_{PKE}, SK_{PKE}$)←PKE. Setup ($\lambda$)

This step includes entering the security parameter $\lambda$, and outputting the PKE public key $PK_{PKE}$ and the PKE private key $SK_{PKE}$. Therein, ($PK_{PKE}, SK_{PKE}$) is a public-private key pair for PKE. The security parameter $\lambda$ determines the bit lengths of the PKE public key $PK_{PKE}$ and the PKE private key $SK_{PKE}$. The greater $\lambda$ is, the securer the PKE public key $PK_{PKE}$ and the PKE private key $SK_{PKE}$ are.

For example, a multiplicative cyclic group G of prime order p is selected, wherein p is equivalent to $\lambda$ in terms of scale.

A generator g∈𝔾 is selected, and an integer s∈$Z_p^*$ is randomly selected.

$h=g^s$ is calculated. The return is ($PK_{PKE}$=(g, h=$g^s$), $SK_{PKE}$=s).

C2 is about executing the encryption algorithm $C_{PKE}$←PKE.Enc($PK_{PKE}$,P).

This step includes entering the public key $PK_{PKE}$=(g, h=$g^s$) and the plaintext P∈𝔾, and probabilistically outputting the PKE ciphertext $C_{PKE}$. For example, an integer r∈$Z_p^*$ is randomly selected to output ($g^r$, $h^r$·P).

C3 is about executing the decryption algorithm P←PKE.Dec($SK_{PKE}$,$C_{PKE}$).

This step includes entering the private key $SK_{PKE}$=s and the PKE ciphertext $C_{PKE}$=($g^r$, t=$h^r$·P), calculating P=$(g^r)^s$·t, and outputting the plaintext P.

If the PKE public key $PK_{PKE}$ and the PKE private key $SK_{PKE}$ used to generate the PKE ciphertext $C_{PKE}$ through encryption form a public-private key pair, the output plaintext P is the plaintext encrypted into the PKE ciphertext $C_{PKE}$; otherwise, P is null.

Taking an Ethereum blockchain network platform for example, the computation required by the protocols can be realized through programming based on smart contracts. Therein, the ciphertext table cipherTable$_{PK}$ and the state table stateTable$_{PK}$ may be realized using on-chain storage variables in the smart contract. The smart contract in Ethereum, once installed, can provide an infinite number of times of services for an infinite number of users. Therefore, in the present embodiment, it is assumed that the smart contract has been installed in Ethereum.

In the present invention, the initialization process A1 executed between the receiving end and the blockchain network comprises the following steps.

In S1, the receiving end is initialized locally to generate a public-private key pair.

The receiving end runs the key-generating algorithms ($PK_{PEKS}$,$SK_{PEKS}$)←PEKS.Setup(λ) and ($PK_{PKE}$,$SK_{PKE}$)←PKE.Setup(λ) for the SPE system PEKS and the public key encryption system PKE, so as to generate the public key $PK_{PEKS}$ and the private key $SK_{PEKS}$ for PEKS, and the public key $PK_{PKE}$ and the private key $SK_{PKE}$ for PKE, making PK←($PK_{PEKS}$,$PK_{PKE}$), SK←($SK_{PEKS}$,$SK_{PKE}$).

In S2, in the blockchain network, initialization of the ciphertext table and the state table is performed for the receiving end.

A miner in the blockchain network, according to the execution flow of the smart contract, initializes the ciphertext table cipherTable$_{PK}$ and the state table stateTable$_{PK}$ for the receiving end. Therein, the ciphertext table cipherTable$_{PK}$ is a dynamic array, storing all the ciphertexts received by the receiving end, with the index starting from 1. The initial length is 0. The state table stateTable$_{PK}$ is of a dictionary structure, and stores the index of the ciphertexts as the result of last search corresponding to all the search trapdoors $T_w$. The ciphertext table cipherTable$_{PK}$ and the state table stateTable$_{PK}$ are both kept in the storage variables in the smart contract. This means that the storage positions are in the blockchain ledger. The values of the variables in the ciphertext table cipherTable$_{PK}$ and in the state table stateTable$_{PK}$ remain unchanged until the miner makes modifications by executing transactions and mining.

The ciphertext-generating and uploading protocol A2 executed between the transmitting end and the blockchain network comprises the following steps.

In S3, the transmitting end based on the shared public key of the receiving end encrypts the keyword and file identifier and generates the ciphertext.

Therein, the transmitting end enters the keyword w and file identifier id to be encrypted, and the public key PK=($PK_{PEKS}$,$PK_{PKE}$) of the receiving end.

The transmitting end executes the keyword-encrypting algorithm to calculate the ciphertext $C_{PEKS}$←PEKS.Enc($PK_{PEKS}$,w) and executes the public key-encrypting algorithm to calculate the file-identifier ciphertext $C_{PKE}$←PKE.Enc($PK_{PKE}$,id), thereby generating the ciphertext C←($C_{PEKS}$,$C_{PKE}$).

In S4, the transmitting end based on the blockchain transaction sends the ciphertext to the blockchain network.

The transmitting end encodes the ciphertext C and the public key PK of the receiving end so as to generate at least one first blockchain transaction Tran$_{up}$, and publishes the first blockchain transaction Tran$_{up}$ to the blockchain network.

In S5, the miner in the blockchain network stores the ciphertext into the ciphertext table of the receiving end.

A mining node in the blockchain network is a miner. According to the requirements of the smart contract, the ciphertext C contained in the first blockchain transaction Tran$_{up}$ published by the transmitting end and the public key PK of the receiving end are obtained through analysis, and the length of cipherTable$_{PK}$ is denoted by len. C is stored in the len+1 position in cipherTable$_{PK}$.

In S6, the miner in the blockchain network executes other transactions and keeps mining.

The miner executes other transactions and performs mining operation. After the miner succeeds in mining, a new block containing the first blockchain transaction Tran$_{up}$ is generated. Then the new block is published to the blockchain network. When the new block is validated and accepted by more than two thirds of the nodes in the blockchain network, the ciphertext C is acknowledged by the blockchain network and stored in the blockchain network.

Preferably, the ciphertext C is acknowledged by the blockchain network and stored in the blockchain network forever.

The search and decryption process A3 executed between the receiving end and the blockchain network comprises the following steps:

In S7, the receiving end based on its own private key and the keyword to be searched to generate a search trapdoor.

The receiving end enters the keyword w to be searched, and the private key SK=($SK_{PEKS}$,$SK_{PKE}$) and executes the search trapdoor-generating algorithm $T_w$ PEKS. Trap door ($SK_{PEKS}$,w) of PEKS, thereby generating a search trapdoor.

In S8, the receiving end based on the blockchain transaction sends the search trapdoor to the blockchain network.

The receiving end performs encoding using the search trapdoor $T_w$ and its own public key PK=($PK_{PEKS}$,$PK_{PKE}$), so as to generate at least one second blockchain transaction Tran$_{srch}$, which is then published to the blockchain network.

In S9, a miner in the blockchain network performs secure search, and outputs the search results to the blockchain network.

After the miner receives the second blockchain transaction Tran$_{srch}$, the search trapdoor $T_w$ and the public key PK are obtained through analysis. Then ind←stateTable$_{PK}$[$T_w$], and the length len of the ciphertext table cipherTable$_{PK}$ are taken. If ind is null, it is indicated that there is no record corresponding to $T_w$ in the state table stateTable$_{PK}$, so ind is initialized into 0. For all the ciphertexts $C_i$←cipherTable$_{PK}$

[i], i∈[ind+1, len], $C_i \leftarrow (C_{PEKS}^i, C_{PKE}^i)$ is determined and b←PEKS.Test($PK_{PEKS}, T_w, C_{PEKS}^i$) is executed. If b=1, ($T_w$, $C_{PKE}^i$) is output to the blockchain network.

Then the record stateTable$_{PK}$[$T_w$]←len in the state table stateTable$_{PK}$ is updated.

With the information recorded in the state table stateTable$_{PK}$, for a given search trapdoor $T_w$, the miner may execute the ciphertext testing algorithm PEKS.Test only for the ciphertexts of that search trapdoor that have not been tested, thereby reducing the workload of the miner.

In S10, the receiving end acquires the search result from the blockchain network and performs decryption to generate the file identifier.

The receiving end based on the search trapdoor $T_w$ fetches all ciphertexts looking like ($T_w, C_{PKE}$) from the blockchain network, and executes the decryption algorithm id PKE.Dec ($SK_{PKE}, C_{PKE}$) to all the file-identifier ciphertexts $C_{PKE}$, thereby acquiring the desired file id.

Since all historical search results of a user are stored in the blockchain network forever, the user can acquire all the ciphertexts that satisfy search criteria through $T_w$.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not come off the concept of the present invention should be encompassed by the appended claims.

The description of the present invention contains a number of inventive concepts, and the applicant reserves the right to file a divisional application based on each of the inventive concepts. The description of the present invention contains a number of inventive concepts, such as "preferably", "according to a preferred embodiment" or "optionally" all indicate that the corresponding paragraph discloses an independent idea, and the applicant reserves the right to file a divisional application based on each of the inventive concepts.

What is claimed is:

1. A method for ensuring search completeness of searchable public key encryption, applicable to a blockchain network formed by a plurality of computer nodes, the method at least comprising:

the blockchain network receiving a keyword ciphertext and a corresponding file-identifier ciphertext generated by a transmitting end based on the public key encryption, and at least one miner storing the ciphertexts in a ciphertext table;

the blockchain network receiving a search trapdoor $T_w$ transmitted by a receiving end, generated according to a private key and a keyword w to be searched;

the at least one miner in the blockchain network performing a secure search based on information of a state table and the search trapdoor $T_w$, and outputting a search result to the blockchain network; and the blockchain network feeding the search result back to the receiving end, further comprising:

the miner in the blockchain network, for the receiving end, initializing a ciphertext table cipherTable$_{PK}$ and a state table stateTable$_{PK}$ on a distributed ledger of the blockchain network, wherein the transmitting end generating the keyword ciphertext and the corresponding file-identifier ciphertext based on the public key encryption comprises:

entering the keyword w, a file identifier id and the public key PK=($PK_{PEKS}, PK_{PKE}$), computing the keyword ciphertext $C_{PEKS}$←PEKS.Enc($PK_{PEKS}$,w) based on a keyword encryption algorithm, and computing the file-identifier ciphertext $C_{PKE}$←PKE.Enc($PK_{PKE}$,id) based on a public key encryption algorithm, so as to generate the ciphertext C←($C_{PEKS}, C_{PKE}$); and encoding the ciphertext C and the public key PK so as to generate at least one first blockchain transaction, and publishing the first blockchain transaction to the blockchain network.

2. The method of claim 1, wherein the public key and the private key are generated through initialization of the blockchain network and the receiving end, in which the blockchain network shares the public key to the transmitting end.

3. The method of claim 1, wherein the at least one miner storing the ciphertext in the ciphertext table comprises:

the at least one miner in the blockchain network analyzing the ciphertext C and the public key PK in the first blockchain transaction, and based on a length len of the ciphertext table cipherTable$_{PK}$, storing the ciphertext C at a len+1 position in the ciphertext table cipherTable$_{PK}$;

the miner, after at least one mining success, generating a new block including the first blockchain transaction block and publishing the new block in the blockchain network, and when the new block including the first blockchain transaction is validated and accepted by more than two thirds of the total nodes in the blockchain network, the ciphertext C being acknowledged by the blockchain network and stored in the blockchain network.

4. The method of claim 3, wherein the receiving end generating the search trapdoor $T_w$ based on the private key and the keyword w to be searched comprises:

entering the keyword w to be searched and the private key SK=($SK_{PEKS}, SK_{PKE}$), executing a search trapdoor-generating algorithm $T_w$←PEKS.Trapdoor($SK_{PEKS}$, w);

encoding the search trapdoor $T_w$ and the public key PK=($PK_{PEKS}, PK_{PKE}$) to generate at least one second blockchain transaction, and publishing the second blockchain transaction to the blockchain network.

5. The method of claim 4, wherein at least one miner performing search based on information of the state table and the search trapdoor $T_w$ comprises:

the miner, based on the second blockchain transaction, analyzing the search trapdoor $T_w$ and the public key PK, so as to extract ind←stateTable$_{PK}$[$T_w$] from the state table stateTable$_{PK}$, and acquiring the length len of the ciphertext table cipherTable$_{PK}$;

ind being null indicating that there is not an entry corresponding to the search trapdoor $T_w$ in the state table stateTable$_{PK}$, and initializing ind to 0;

for an integer i that satisfies ind+1≤i≤len, taking the $i^{th}$ ciphertext $C_i$←cipherTable$_{PK}$[i] from the ciphertext table cipherTable$_{PK}$, in which the ciphertext $C_i$ is denoted by ($C^t_{PEKS}, C^t_{PKE}$), and executing the following operation:

based on the PEKS public key $PK_{PEKS}$, the search trapdoor Tw and the keyword ciphertext $C^i_{PEKS}$, executing a keyword ciphertext testing algorithm b←PEKS.Test ($PK_{PEKS}, T_w, C^i_{PEKS}$), so as to obtain a bit value b, and if b=1, indicating that the keyword ciphertext $C^i_{PEKS}$ includes the keyword w to be searched, and outputting a tuple $(T_w, C^i_{PKE})$ composed of the search trapdoor and the file-identifier ciphertext as a search result to the blockchain network.

6. The method of claim 5, wherein at least one miner, based on the information of the state table and the search trapdoor $T_w$, executing the secure search further comprises:

the miner, after at least one mining success, generating a new block including the second blockchain transaction block and publishing the new block in the blockchain network, and when the new block including the second blockchain transaction is validated and accepted by more than two thirds of the total nodes in the blockchain network, the search trapdoor $T_w$ and the public key PK as well as the corresponding search result being acknowledged by the blockchain network and stored in the blockchain network.

7. The method of claim 6, further comprises:

the receiving end, based on search trapdoor $T_w$, fetching at least one search result from the blockchain network, and executing a decryption algorithm id←PKE.Dec($SK_{PKE}, C_{PKE}$) to the file-identifier ciphertext $C_{PKE}$, so as to obtain the desired file identifier id.

8. The method of claim 7, wherein the initialization process executed between the receiving end and the blockchain network comprises:

the receiving end being initialized locally to generate a public-private key pair; and in the blockchain network, initialization of the ciphertext and the state table being performed for the receiving end.

* * * * *